July 21, 1953  D. C. CHAMBERS ET AL  2,646,291
VEHICLE SHORT TURN STEERING APPARATUS
Filed Feb. 18, 1950
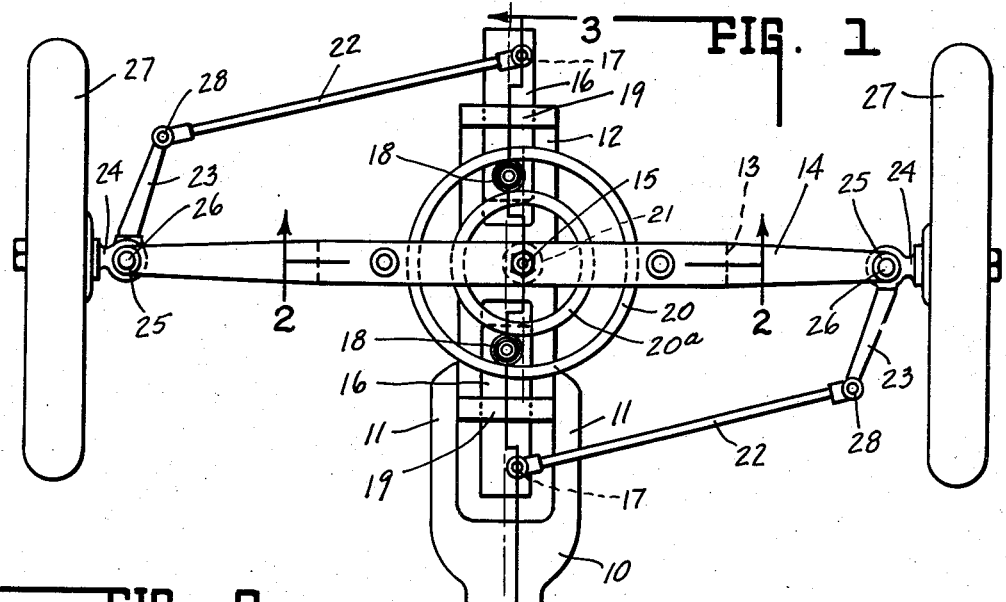
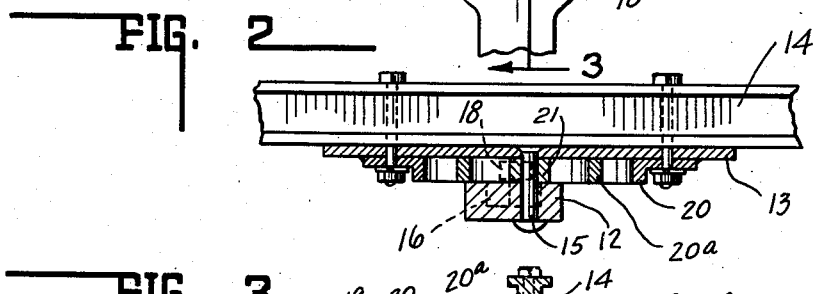
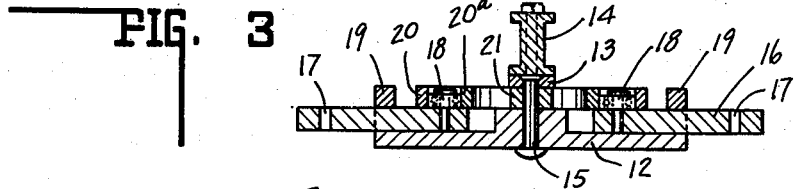
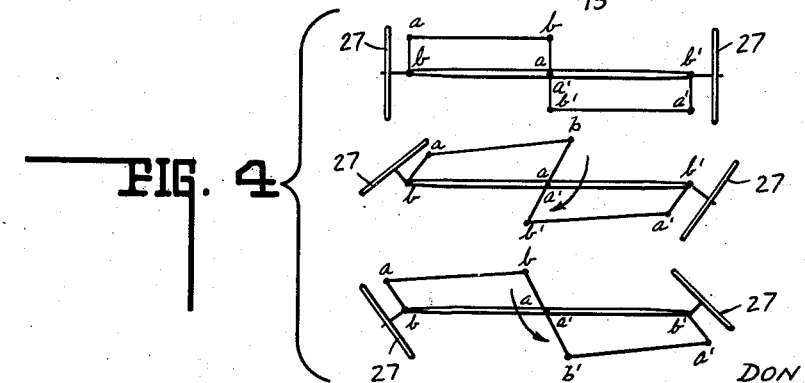
INVENTORS.
DON C. CHAMBERS.
WILBURN D. CHAMBERS.
BY Lockwood, Goldsmith & Galt.
ATTORNEYS.

Patented July 21, 1953

2,646,291

UNITED STATES PATENT OFFICE 2,646,291

VEHICLE SHORT TURN STEERING APPARATUS

Don C. Chambers, Bloomington, and Wilburn D. Chambers, Indianapolis, Ind.

Application February 18, 1950, Serial No. 144,956

4 Claims. (Cl. 280—103)

This invention relates to a vehicle steering construction for use particularly with farm wagons and the like. The primary object of this invention is to provide a steering construction of such character that little or no wheel slippage results upon making a turn regardless of the shortness or extreme angle of the turn. In the conventional wagon construction considerable slippage attends the negotiation of any turn. Where rubber tires are used on such vehicles it is obvious that considerable wear and depreciation results from such slippage.

It is a further object of the present invention to provide a steering construction of such character that less power will be required in the negotiation of any turn. This is accomplished through the provision of a construction which will enable the rear wheels to track the front wheels to such a degree that there will be less friction between the tire or wheel and the pavement upon which the vehicle is traveling. The less friction there is, the less power is, of course, required to move any vehicle.

It is a further object of the present invention to provide a steering construction of such a nature that the front wheels of a farm wagon and the like will be capable of turning relative to the axle thereof, and which will also turn to a different degree relative to each other. This is accomplished through the provision of means which always cause the inside front wheel of the wagon to turn to a sharper angle relative to the axle than the outside wheel thereof.

It is a further object of the present invention to provide a steering construction of such type that a very sharp turn may be negotiated with perfect freedom from wheel slippage.

The full nature of the invention will appear in the accompanying drawings and the following description and claims:

In the drawings Fig. 1 is a top plan view of the invention including the drag links, steering knuckles and wheels.

Fig. 2 is a sectional view thereof taken on line 2—2 of Fig. 1.

Fig. 3 is a sectional view thereof taken on line 3—3 of Fig. 1.

Fig. 4 is a schematic view showing the different positions of the front wheels of the vehicle being drawn including its drag links, steering knuckle arms and axle, during left and righthand and straight-ahead positions respectively.

In the drawings, the tongue which connects the vehicle being drawn (such as a farm wagon) to the drawing vehicle (such as a tractor), is shown at 10. A portion of the tongue is bifurcated, the arms 11 thereof defining the bifurcated area. Spanning this area and embraced by said arms is the elongated guideway member 12. This member is suitably secured to said arms and, as well, to the axle 14 by the king pin 15.

Slidable longitudinally within the guideway are the plates 16 which have formed therethrough adjacent the outer end thereof the aperture 17 for the purposes hereinafter described. The longitudinal center lines of these plates are in alignment with the longitudinal center line of the vehicle. Projecting upwardly adjacent the inner end of each sliding plate is the roller 18, the axis of which is spaced equidistant from either side edge of the plates. Bridging the groove of the guideway in order to limit any substantial vertical displacement of the sliding plates are the bridge elements 19. These elements are preferably disposed adjacent either end of the guideway but may be positioned at any point that will satisfactorily serve to limit said vertical displacement.

Suitably connected to the axle 14 intermediate the ends thereof but spaced therefrom by the spacer element 13 is a pair of concentric bands or rings 20 and 20a. The distance between adjacent sides of said concentric bands is but slightly greater than the diameter of said rollers which project upwardly as aforesaid from the sliding plate 16 and into abutting engagement between said adjacent sides. The rollers are thus capable of arcuate movement relative to said bands within the path defined by said band sides, upon movement of the tongue 10 with which the sliding plate and the guideway are associated.

Enveloping the king pin is a collar 21 which is positioned immediately below the spacer element and in abutting relation therewith. It is to be observed that this collar and the king pin which it envelops are positioned off center relative to the longitudinal center line of the vehicle. It has been determined through experimentation that the king pin and its collar should be approximately 5/8 of an inch to one side of the absolute longitudinal center line of the vehicle. As aforementioned, the axis of each of the rollers projecting upwardly from said plates is equidistant from the sides thereof and is, therefore, in alignment with said absolute longitudinal center of the plate. The purpose of this location will be hereinafter described for it is critical.

Secured within each of the apertures 17 adjacent the outer ends of said sliding plates, are the drag links 22. The apertures are themselves located the same distance to one side of the longitudinal center of said sliding plates as is the axis of the king pin, namely ⅝ of an inch. Pivotally connected to the free end of each drag link is the steering knuckle arm 23 which in turn is itself connected to the steering knuckle 24. The steering knuckle is pivotally secured to the bifurcated axle extremities 25 by the king pins 26. The tires of the vehicle are shown at 27. It is essential that the pivot pin 28 connecting the drag link 22 with the steering knuckle arm 23 be the same distance inwardly of the king pin 26 as is the axis of the rollers from the king pin 15, namely ⅝ of an inch, when the wheels 27 are disposed straight ahead as shown in the drawings. It is, of course, possible to vary slightly the abovementioned ⅝ of an inch distances of separation, provided, however, that the same distance is always adhered to.

When the drawing vehicle such as a tractor or the like makes a turn in one direction or the other, the tongue naturally swings laterally in the same direction. Since the guideway is secured to the bifurcated extremity of the tongue and since the sliding plates are associated with said guideway, both the guideway and the plates move in the same direction and to the same angular degree as does the tongue. The concentric bands, however, remain stationary, they being secured as aforesaid to the axle which is not moved by the tongue, the guideway or the sliding plate. The axle and the body of the wagon will, of course, swing arcuately as the tires connected thereto are themselves swung, but not to the same degree. This is accomplished in the following way: As the sliding plates and the guideway swing laterally, the rollers secured to the former are caused to move in the arcuate path defined by the sides of the bands. When a turn is made for example to the right, the cam action resulting from the association of the rollers with the confronting faces of the bands forces the sliding plates rearwardly a slight distance. This relative motion between the plates and the guideway is caused by the off center position of the king pin 15 relative to the absolute center line of the sliding plates and of the vehicle. To express it in a different way, the axis of the rollers is offset relative to the axis of the king pin, and as the rollers are caused to move relative to the bands upon the tongue being moved laterally to the right, the sliding plates are automatically forced rearwardly relative to said guideway. As the tongue, the guideway and the plates are thus moved laterally to the right, the drag links secured within the apertures 17 of the sliding plate are also moved. In view of the fact that the plates are moved rearwardly a slight distance relative to the guideway during the lateral movement of both, the left or outside wheel of the vehicle being drawn will be inclined to the right at a lesser degree than will the right or inside wheel. If the plates did not move relative to the guideway, it would, of course, be true that both wheels would automatically be turned to the right at the same angle. But in view of the fact that the plates do move rearwardly when such a turn to the right is made, it necessarily follows that the left wheel of the vehicle being drawn does turn to a lesser degree than does the right. The same operation automatically follows when the tongue is moved laterally to the left. At such a time the plates move forwardly relative to the guideway, thereby causing the right or outer wheel of the vehicle being drawn to turn to a lesser degree to the left than does the left wheel.

It thus follows that the inside wheel of the vehicle being drawn always is inclined to a greater degree relative to the axis than is the outer wheel, regardless of in which direction the tongue is laterally moved. It is, of course, obvious that this is a very desirable accomplishment for the reason that the outside wheel always traverses a much longer arc than does the inside wheel. If both wheels were inclined to the same degree relative to the axle, the movement of the outside wheel would be attended by considerable slippage since it could not in effect "keep up" with the inner wheel. This condition not only is undesirable by reason of wear and tear upon any rubber tires which may be used, but also because greater power is required to negotiate a turn since more friction between the outside wheel and the ground attends any movement which is attended by slippage.

In the schematic drawings of Fig. 4 there is shown in theory the reason why the inside wheel is always inclined to a greater degree relative to the axle than is the outside wheel. In those drawings the included angles of one rectangle which comprises the axle, a sliding plate, a drag link and a steering knuckle arm are shown as $a$ and $b$. The included angles of the oppositely disposed rectangle which is comprised of the axle, a sliding plate, a drag link and a steering knuckle arm are designated $a^1$ and $b^1$. The construction is such that it may be represented mathematically by the following formula: When the wheels of the vehicle being drawn are disposed in straightaway parallel relation:

$$2(a+b)=2(a^1+b^1)$$

When, however, the tongue of the drawing vehicle is swung laterally to the right as shown in the second illustration of Fig. 4, the right wheel will, as aforesaid, be inclined relative to the axle to a greater degree than will the left or outside wheel. At such times the included angles of the aforementioned rectangles will differ one relative to the other. This is shown by the mathematical formula $a-b>a^1-b^1$. To illustrate further, the included angles shown in the second illustration of Fig. 4 will be approximately the following: $a=135°$ and $b=45°$ whereas $a^1=100°$ and $b^1=80°$. Consequently, in using figures instead of letters in the above-mentioned formula, $135°-45°>100°-80°$, the difference being between $90°-20°$.

In the third illustration appearing in Fig. 4, where the tongue is swung laterally to the left, the inside or left wheel will be inclined relative to the axle at a greater degree than the right or outside wheel. Speaking mathematically, the included angles of the rectangles will have a formula as follows: $b^1-a^1>b-a$. By way of illustration $b^1$ is approximately 140° and $a^1$, 40°. On the other hand, $b$ is approximately 95° and $a$, 85°. Thus, when using figures instead of letters, $140°-40°>95°-85°$, i. e. $100°>10°$.

It is thus apparent from the above illustrations and the foregoing description that considerable less slippage attends the negotiation of any turn for the reason that the distances of travel of the outside and inside wheels, which obviously differ, are compensated for by having the wheels angled to a different degree. As a consequence of this arrangement, the rear wheels (not shown)

of the vehicle being drawn will track the front wheels to a much greater degree than in any of the vehicle constructions heretofore used.

While the invention has been illustrated and described in its preferred embodiment in the drawings and foregoing description, the same is to be considered as illustrative and not restrictive in character.

The invention claimed is:

1. A vehicle steering construction comprising a tongue, an axle having a pair of wheels mounted thereon, a pair of annular members connected to said axle and being concentrically positioned relative to each other, said members having their axes positioned in off center relation to the longitudinal center line of said vehicle, means secured to said tongue and including a pair of oppositely disposed free floating elements extending transversely of said axle, said elements each having a cam follower interposed in the space defined by the inner circumferential face of the outer annular member and the outer circumferential face of the inner annular member and engaging each of said faces, said followers being located on a common axis coincident with the longitudinal center line of said vehicle, whereby said elements are moved longitudinally in opposite directions respectively relative to said tongue as said tongue is laterally swung in opposite directions, and independent means connecting each of said wheels to a corresponding element on opposite sides of said axle.

2. A vehicle steering construction comprising a tongue, an axle having a pair of wheels mounted thereon, a pair of annular members connected to said axle and being concentrically disposed relative to each other, a longitudinally disposed guideway secured to said tongue and extending transversely of said axle, a pair of slidable elements, each element of the pair being disposed in said guideway on opposite sides of said axle and having a roller interposed between said members and engageable therewith, the axis of said concentric members being disposed in off center relation to the axes of said rollers and to the longitudinal center line of said vehicle, whereby each of said elements is moved longitudinally in opposite directions respectively relative to said guideway as said tongue is laterally swung in opposite directions, and independent means connecting each of said wheels to a corresponding element on opposite sides of said axle.

3. A vehicle steering construction comprising a tongue, an axle connected to said tongue and having a steering knuckle secured at each end thereof and a wheel mounted on each of said steering knuckles, an elongated guideway secured to said tongue and movable laterally therewith, a pair of free floating elements, each element of the pair being disposed in said guideway on opposite sides of said axle and having a roller, a pair of annular members connected to said axle and being concentrically positioned relative to each other, the axis of said members being disposed in offset relation to the axes of said rollers and to the longitudinal center line of said vehicle, said rollers being interposed between said members and engageable therewith, whereby said elements are moved longitudinally in opposite directions respectively relative to said guideway as said tongue is swung laterally in opposite directions, and independent means connecting each of said wheels to a corresponding element, said independent means including a pair of drag links each being secured at one end thereof to an element on opposite sides of said axle, and a pair of steering knuckle arms each being connected at one end to the free ends respectively of said links and at the opposite ends thereof respectively to said steering knuckles.

4. A vehicle steering construction comprising a tongue, an axle connected to said tongue and having a steering knuckle mounted on opposite ends thereof and a wheel mounted on each of said steering knuckles, a pair of annular members connected to said axle and being concentrically positioned relative to each other, the axis of said members being disposed in offset relation to the longitudinal center line of said vehicle, an elongated guideway secured to said tongue and movable laterally therewith, a pair of free floating elements operably associated with said guideway and being positioned therein on opposite sides respectively of said axle, said elements each having a roller disposed between said annular members and engageable therewith, said rollers having their axes in alignment with the longitudinal center line of said vehicle whereby said elements are simultaneously movable longitudinally in opposite directions respectively relative to said guideway as said tongue is swung laterally in opposite directions, and independent means connecting said elements respectively to said wheels, said independent means comprising a pair of drag links each being secured at one end thereof to its corresponding element, and a pair of steering knuckle arms each being secured at one end thereof to the free ends respectively of said links, and at the opposite ends thereof to said steering knuckles respectively.

DON C. CHAMBERS.
WILBURN D. CHAMBERS.

References Cited in the file of this patent

UNITED STATES PATENTS

| Number | Name | Date |
|---|---|---|
| 721,986 | White | Mar. 3, 1903 |
| 1,472,940 | Ross | Nov. 6, 1923 |
| 1,632,665 | Mitchell | June 14, 1927 |
| 2,584,672 | Clemons | Feb. 5, 1952 |

FOREIGN PATENTS

| Number | Country | Date |
|---|---|---|
| 187,923 | Great Britain | Nov. 2, 1922 |
| 274,498 | Germany | May 26, 1914 |